United States Patent
Seki

[11] Patent Number: 6,037,858
[45] Date of Patent: Mar. 14, 2000

[54] COMMUNICATION APPARATUS

[75] Inventor: Noboru Seki, Miyagi-Ken, Japan

[73] Assignee: ALPS Electric Co., Ltd., Tokyo, Japan

[21] Appl. No.: 08/933,650

[22] Filed: Sep. 19, 1997

[30] Foreign Application Priority Data

Sep. 20, 1996 [JP] Japan ................... 8-250424

[51] Int. Cl.[7] .................................................. B60R 25/10
[52] U.S. Cl. ................. 340/426; 340/425.5; 340/825.31; 340/825.34; 307/10.2; 180/287
[58] Field of Search ................... 340/425.5, 426, 340/539, 825.31, 825.34; 307/10.2, 10.3; 180/287

[56] References Cited

U.S. PATENT DOCUMENTS

| | | | |
|---|---|---|---|
| 5,377,270 | 12/1994 | Koopman, Jr. et al. | 380/25 |
| 5,406,274 | 4/1995 | Lambropoulos et al. | 340/825.69 |
| 5,506,575 | 4/1996 | Ormos | 340/825.31 |
| 5,513,105 | 4/1996 | Krones | 364/424.01 |
| 5,602,536 | 2/1997 | Henderson et al. | 340/825.31 |
| 5,635,916 | 6/1997 | Bucholtz et al. | 340/426 |
| 5,648,764 | 7/1997 | Nose et al. | 340/825.32 |
| 5,677,680 | 10/1997 | Yoda | 340/825.57 |
| 5,742,236 | 4/1998 | Cremers et al. | 340/825.31 |
| 5,783,989 | 7/1998 | Issa et al. | 340/426 |

FOREIGN PATENT DOCUMENTS 7-71337  7/1995  Japan .

*Primary Examiner*—Jeffery A. Hofsass
*Assistant Examiner*—Sihong Huang
*Attorney, Agent, or Firm*—Brinks Hofer Gilson & Lione

[57] ABSTRACT

A communication apparatus for preventing an unauthorized use of a lost transmitter, and for making a use of that transmitter possible by a simple operation when the lost transmitter is subsequently found, including a receiver having a storage unit for storing an ID code, a signal processing unit for comparing a received ID code transmitted from a transmitter with the stored ID code, and for transmitting a control signal corresponding to a function code received from the transmitter to a controlled unit when the received ID code matches the stored ID code, and a mode control unit for either setting the operation mode of the signal processing unit to a ID code write mode in which a the received ID code is written into the storage unit, for setting to a control signal output stop mode which stops an output of the control signal from the signal processing unit to prevent unauthorized use of a lost transmitter, or resetting from the control signal output stop mode to a normal mode to allow re-use of the lost transmitter, when subsequently found.

13 Claims, 6 Drawing Sheets

COMMUNICATION APPARATUS

BACKGROUND OF THE INVENTION

1. Field of the Invention

The present invention relates to a communication apparatus, and more particularly to a communication apparatus including one or more remote control (remote-con) transmitters, and one receiver installed inside of a mobile unit, such as an automobile, etc., for selectively controlling and operating a controllable device of the mobile unit, such as a door lock of an automobile, in accordance with switch information, when a variety of switch information transmitted from the transmitter is received by the receiver.

2. Description of the Related Art

A keyless entry apparatus is a known communication system including one or more remote control (remote-con) transmitters and one receiver installed inside of, for example, an automobile. Keyless entry apparatus are used for selectively controlling and operating a controllable device of the automobile (such as the door lock) in accordance with switch control information which is transmitted with identification information from the remote-con transmitters to the receiver.

FIG. 6 is a schematic configuration diagram showing one example of a known keyless entry apparatus which is disclosed in the Japanese Examined Patent Publication No. 7-71337.

As shown in FIG. 6, this keyless entry apparatus consists of, for example, three remote-con transmitters 41-1, 41-2, 41-3, and one receiver 42 installed inside an automobile.

The three remote-con transmitters 41-1, 41-2 and 41-3 respectively include transmission circuit units 43-1, 43-2 and 43-3 for forming transmission signals, identification data storage units (ROM) 44-1, 44-2 and 44-3 for storing identification data R-1, R-2 and R-3 intrinsic to each of the transmitters 41-1, 41-2 and 41-3, and transmitting antenna 45-1, 45-2 and 45-3.

The receiver 42 includes a receiving circuit unit 47 for receiving a transmitted signal through a receiving antenna 46, amplifying the received signal, and wave-shaping the amplified signal, etc., a signal processing unit 48 which is operated in various operation modes corresponding to a variety of control and operation functions of the receiver 42, a storage unit (EEPROM) 49 for storing the identification data R-1, R-2 and R-3, a set-up switch 50 consisting of two switches 50-1, 50-2, for setting the operation mode of the signal processing unit 48, in correspondence with an open/close state thereof, to any of an operation mode, a normal mode, a write mode, and an elimination mode, a door control unit 51 for executing a door lock or a door unlock operation for the automobile, a displaying and informing unit 52 having a light emitting diode and a horn, etc., for signaling a user when the signal processing unit 48 changes from the write mode or the elimination mode to the normal mode, and a timer 53 incorporated into the signal processing unit 48.

The keyless entry apparatus with the above-mentioned configuration operates as follows.

First, the signal processing unit 48 of the receiver 42 is set in the normal mode by switching both switches 50-1 and 50-2 of the set-up switch 50 on the receiver 42 to an open state. In the normal operation mode, when one of the three remote-con transmitters, for example, the remote-con transmitter 41-1, is operated, a door locking or door unlocking operation of the automobile is designated in the transmission circuit unit 43-1 of the remote-con transmitter 41-1, and a control signal (FSK Modulation signal) including the identification data R-1 stored in the identification data storage unit 44-1 is formed, and this control signal is transmitted from the transmitting antenna 45-1 as a radio frequency (RF) transmission signal.

In the receiver 42, when a transmission signal from the remote-con transmitter 41-1 is received by the receiving circuit unit 47 through the receiving antenna 46, the received control signal is amplified and wave-shaped, and then transmitted to the control processing unit 48. First, the signal processing unit 48 compares the identification data R-1 in the received control signal with the identification data R-1 stored in the storage unit 49, and if they are identical, the signal processing unit 48 transmits a control signal to a door lock circuit which identifies a locked state of the automobile door, and then unlocks the door if the door was locked, or locks the door if the door was not locked.

Next, to change the operation mode of the signal processing unit 48 of the receiver 42 from the normal mode to a write mode, that is, for writing the identification data R-1, R-2 or R-3 into the storage unit 49, only one switch 50-1 of the setting switches 50 on the receiver 42 is closed, and the timer 53 is started. If one of three remote-con transmitters, for example, the remote-con transmitter 41-1, is operated immediately after the signal processing unit 48 is switched to the write mode, then a control signal including the identification data R-1 stored in the identification data storage unit 44-1 is formed in the transmitting circuit unit 43-1 of the remote-con transmitter 41-1 and transmitted via the antenna 45-1, and when this control signal is received by the receiver 42, the control signal is transmitted from the receiving circuit unit 47 to the signal processing unit 48, the signal processing unit 48 supplies the identification data R-1 in this control signal to the storage unit 49, and the identification data R-1 is stored in the storage unit 49. When the count value t counted with the timer 53 reaches a predetermined value T, such as 5 seconds, the displaying and informing unit 52 is activated temporarily to notify the user of an operation mode change. Then, after having notified the user of an operation mode change, the operation mode of the signal processing unit 48 is reset automatically from the write mode to the normal mode.

To change the operation mode of the signal processing unit 48 on the receiver 42 side from the normal mode to an elimination mode, that is, when executing a batch elimination (erasure) of the identification data R-1, R-2 and R-3 stored in the storage unit 49, first, only one switch 50-1 of the setting switch 50 on the receiver 42 side is closed, the timer 53 is started, and immediately thereafter, the other switch 50-2 of the setting switch 50 is also closed. When such settings of the switches 50-1, 50-2 are executed, the batch elimination of the identification data R-1, R-2 and R-3 stored in the storage unit 49 is executed, and when the batch elimination of the identification data R-1, R-2 and R-3 is completed, then the displaying and informing unit 52 acts temporarily and after having informed the completion of the elimination of the stored contents in the storage unit 49, the operation mode of the signal processing unit 48 is reset automatically from the elimination mode to the normal mode.

The storage unit 49 has a plurality of storage areas into which a plurality of identification data R are written. During each writing operation, the (k) identification data R are sequentially written into the (k) storage areas of the storage unit 49. However, when the number of identification data R is greater than the number of storage areas (i.e., equal to or greater than k+1), then the initial identification data R is over-written by the new identification data R. For example, the first-entered identification data R-1 is over-written by the identification data R-k+1.

According to the known keyless entry apparatus, when one of the remote-con transmitters, for example, the remote-con transmitter 41-1, is lost, the identification data R-1, R-2 or R-3 intrinsic to all the remote-con transmitters 41-2, 41-3 including that remote-con transmitter 41-1 is typically batch-erased from the storage unit 49 on the receiver 42 in order to maintain high security in the keyless entry apparatus.

In general, when one of the remote-con transmitters, for example, the remote-con transmitter 41-1, is lost, it is necessary to alter the keyless security apparatus so that the remote-con transmitter 41-1 cannot be used to perform a door unlock operation.

The above-mentioned keyless entry apparatus responds to such requirement in a manner that the identification data R-1 of the lost remote-con transmitter 41-1 is eliminated from the storage unit 49, by renewing the identification data R-1 already stored in the storage unit 49, or that the identification data R-1 of the lost remote-con transmitter 41-1 is eliminated from the storage unit 49, by batch-erasing the plurality of identification data R-1, R-2 and R-3 stored in the storage unit 49.

In this case, because it is not known what kind(s) of identification data is (are) stored in what storage area(s) in the storage unit 49, when eliminating the identification data R-1 of the remote-con transmitter 41-1 from the storage unit 49, or the identification data R-1, R-2 and R-3 stored in all the storage areas of the storage unit 49, the above mentioned known keyless entry apparatus must eliminate them by over-writing the identification data R-2 and R-3 of the other remote-con transmitters 41-2 and 41-3, except the identification data R-1.

Incidentally, after having eliminated the identification data R-1 associated with the lost remote-con transmitter 41-1 from the storage unit 49, if the remote-con transmitter 41-1 is subsequently found, in order to enable the keyless entry apparatus to reuse that remote-con transmitter 41-1, the identification data R-1 of the remote-con transmitter 41-1 must be rewritten into the storage unit 49. In a case such as this, even when re-writing the eliminated identification data R-1 into the storage unit 49, regardless of the fact that writing of the identification data R-1 of the remote-con transmitter 41-1 had been previously performed, the above-mentioned known keyless entry apparatus is required to execute a writing of the identification data R-1, R-2 and R-3 of all the remote-con transmitters 41-1, 41-2 and 41-3 including the remote-con transmitter 41-1. Further, when having batch-erased the identification data R-1, R-2 and R-3 of all the remote-con transmitters 41-1, 41-2 and 41-3 from the storage unit 49, in order to make a keyless entry operation at the receiver 42 possible, the above-mentioned known keyless entry apparatus is also required to execute a writing of the identification data R-1, R-2 and R-3 of all the remote-con transmitters 41-1, 41-2 and 41-3 including the remote-con transmitter 41-1.

In this way, the above mentioned known keyless entry apparatus has such a problem that requires a complicated operation of executing a rewriting of the identification data R-1, R-2 and R-3 of all the remote-con transmitters 41-1, 41-2 and 41-3, in order to make the remote-con transmitter 41-1 thereof possible to use again, when the lost remote-con transmitter 41-1 was found, after having altered the keyless entry apparatus such that the lost remote-con transmitter 41(1) is impossible to use.

SUMMARY OF THE INVENTION

The present invention is directed to solve such problems, and an object of the present invention is to provide a communication apparatus for preventing an unauthorized use of a lost transmitter, and for making reuse of that transmitter possible by a simple operation when the lost transmitter is subsequently found.

In order to accomplish the above mentioned object, a communication apparatus according to the present invention comprises means which include a mode control unit and a control function stop storage unit for setting an operation mode of a signal processing unit on a receiver to an ID code write mode, during which writes into the storage unit the ID code received from a normal mode which generates a control signal for a controlled unit, at a time when a received function code and an externally applied information are in a first predefined supply state, and for setting said operation mode of said signal processing unit on the receiver side to a control signal output stop mode which stops an output of the control signal for the controlled unit, at a time when a received transmission code and an externally applied information are in a second predefined supply state, as well as for resetting the operation mode of the signal processing unit from the control signal output stop mode to the normal mode, in response to a third predefined supply state of the received function code and the externally applied information.

Rendering to adopt such means, when one of the one or more transmitters has been lost, by setting the operation mode of the signal processing unit on the receiver side from the normal mode to the control signal output stop mode, the lost transmitter is made impossible to use, thereby a unauthorized use of the lost transmitter can be prevented.

Further, rendering to adopt such means, at a time when either setting the operation mode of the signal processing unit from the normal mode to the IDcode write mode, setting from the normal mode to the control signal output stop mode, or setting from the control signal output stop mode to the normal mode, and since the main operation procedures are common, and other operation procedures slightly differ for each setting, the operation procedures are easily remembered at the user side, and when the lost transmitter was found, a reuse is made possible by simple operation procedures.

In an aspect of implementing the present invention, a communication apparatus, comprises a transmitter for transmitting a transmission code including an intrinsic ID code and a variety of function codes at a time of an operation; a receiver, including:a storage unit being capable of writing a received ID code; a signal processing unit for comparing the received ID code with an ID code written in the storage unit, and for outputting to a controlled unit a control signal corresponding to a class of the function code at a time when they match; a mode control unit and a control function stop storage unit for setting an operation mode of the signal processing unit to an ID code write mode which write the ID code into the storage unit from a normal mode which outputs the control signal, in response to a first predefined supply state of an externally applied information and a received transmission code, for setting the operation mode of the signal processing unit to a control signal output stop mode which stops an output of the control signal from the normal mode, in response to a second predefined supply state of an externally applied information and a received transmission code, as well as for resetting the operation mode of the signal processing unit from the control signal output stop mode to the normal mode, in response to a third predefined supply state of an externally applied information and a received transmission code.

In one aspect of implementing the present invention, the communication apparatus is such that the operation mode of the signal processing unit is set to the control signal output stop mode, with limited to a case of which the transmission code and externally applied information are supplied in the second predefined supply state, when the operation mode of the signal processing unit is set from the normal mode to the ID code write mode, and then from the ID code write mode to the normal mode. In other aspect of implementing the present invention, the communication apparatus is such that the control function stop code is written into the control function stop storage unit when the operation mode of the signal processing unit is set to the control signal output stop mode, and the control function stop code written into the control function stop storage unit is eliminated when resetting from the control signal output stop mode to the normal mode.

In a preferred example of an aspect of implementing the present invention, the communication apparatus is such that the externally applied information consists of information which can be obtained by an operation of an ignition key of an automobile.

In other preferred example of an aspect of implementing the present invention, the communication apparatus is such that the transmitter sends a variable code as well as the ID code and function code, and the receiver evaluates whether the received variable code is proper or improper, and with limited to a case of which it is proper, generates a control signal corresponded to a class of function code received with respect to the controlled unit from the signal processing unit.

In accordance with an aspect of the present invention, by setting the operation mode of the signal processing unit on the receiver side from the normal mode to the control signal output stop mode, when one of the one or more transmitters has been lost in some reason, the lost transmitter is made impossible to use, thereby a unauthorized use of the lost transmitter can be prevented.

Further, in accordance with an aspect of the present invention, at a time when changing the operation mode of the signal processing unit of the receiver by a control of the mode control unit, that is, for each of, when setting from the normal mode to the ID code write mode, setting from the normal mode to the control signal output stop mode, or setting from the control signal output stop mode to the normal mode, since the main operation procedures are determined to become common operations, and other operation procedures just slightly-differ for each setting time, the operation procedures are easy to remember when executing these settings at the user side, thereby making the setting with a fallacious operation procedures is less likely.

Moreover, in accordance with an aspect of the present invention, by changing the operation mode of the signal processing unit of the receiver from the control signal output stop mode to the normal mode at a time when a previously lost transmitter was found, a reuse of this transmitter is made possible by simple operation procedures.

DESCRIPTION OF THE PREFERRED EMBODIMENTS

Embodiments of the present invention will now be described with reference to the accompanying drawings.

Figure 1:
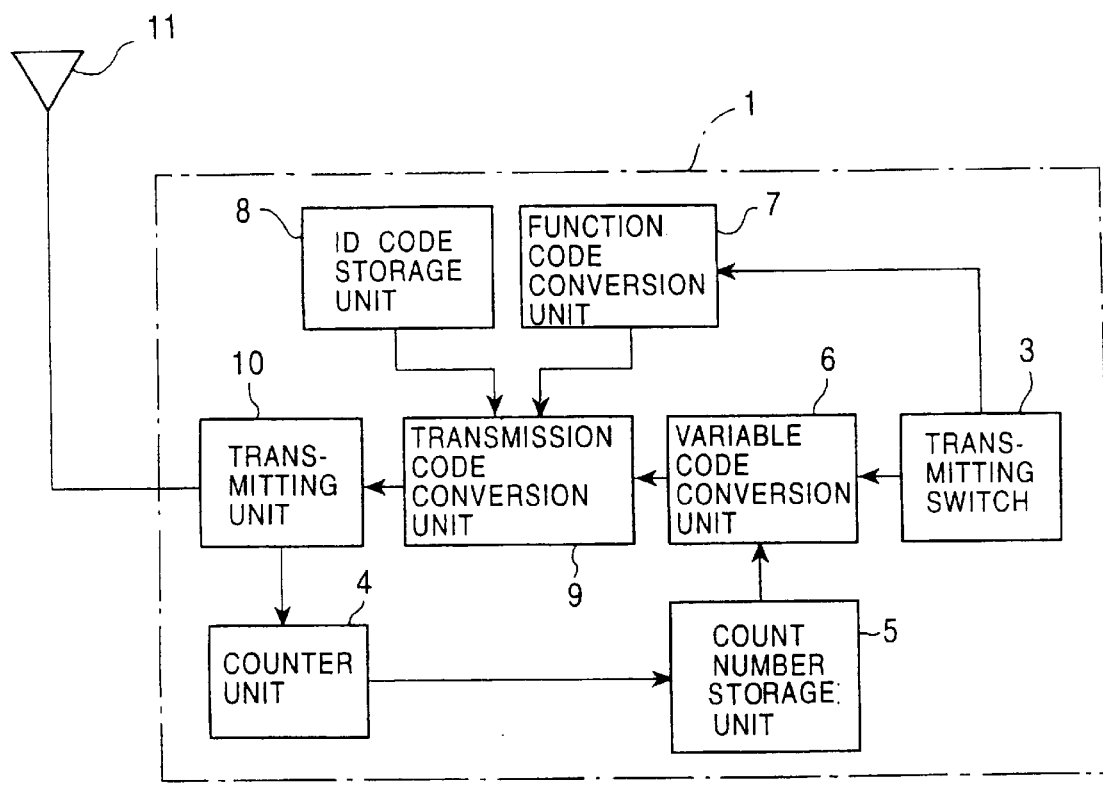
FIG. 1 is a block configuration diagram showing one embodiment of the transmitter of the communication apparatus in accordance with the present invention.
Figure 2:
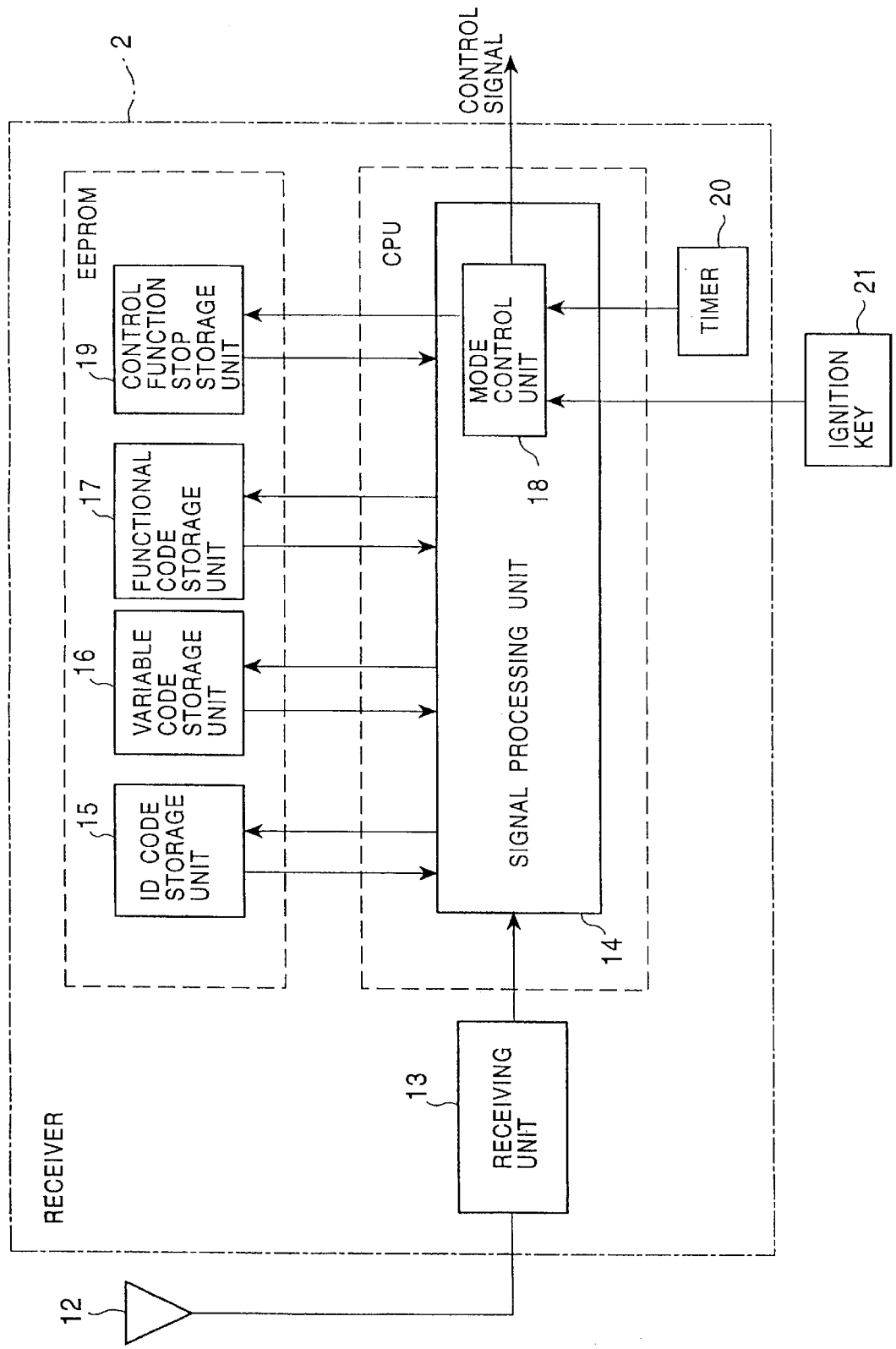
FIG. 2 is a block configuration diagram showing one embodiment of the receiver of the communication apparatus in accordance with the present invention.

FIG. 1 is a block configuration diagram showing one embodiment of the transmitter in the communication apparatus in accordance with the present invention, and FIG. 2 is a block configuration diagram showing one embodiment of the receiver in the communication apparatus in accordance with the present invention, and showing an example in which the communication apparatus is a keyless entry apparatus.

As shown in FIG. 1 and FIG. 2, the keyless entry apparatus of this embodiment consists of at least one remote-con transmitter 1 (only one transmitter is shown, all of the transmitters have the same configuration), and one receiver 2 installed, for example, within an automobile.

The remote-con transmitter 1 includes a transmitting switch unit 3, a counter unit 4, a count number storage unit 5, a variable code conversion unit 6, a function code conversion unit 7, an ID code storage unit 8, a transmission code conversion unit 9, a transmitting unit 10, a transmitting antenna 11, all being interconnected as shown in FIG. 1.

In this case, the transmitting switch unit 3 generates a variety of switch information for executing of a controlled unit (such as a door lock) of the automobile, for example, locking/unlocking a door, and the count unit 4 counts a transmitting operation of the transmitting unit 10, as described below. The count number storage unit 5 stores a count value of the count unit 4, the variable code conversion unit 6 calls a count value from the count number storage unit 5, and outputs a variable code whose numerical value is determined according to the count value, which changes each time switch information is received from the transmitting switch 3. The function code conversion unit 7 converts a switch information output from the transmitting switch 3 to a function code corresponding to a content of the switch information, and the ID code storage unit 8 stores an ID code intrinsic to the remote-con transmitter 1. The transmission code conversion unit 9 forms a transmission code consisting of a head code, an ID code, a function code, a variable code, an end code, and the transmitting unit 10 converts the transmission code obtained in the transmitting code conversion unit 3 into a form of a transmitting signal, and transmits this transmitting signal via the transmitting antenna 11.

The receiver 2 includes a receiving antenna 12, a receiving unit 13, a signal processing unit 14, an ID code storage unit 15, a variable code storage unit 16, a function code storage unit 17, a mode control unit 18, a control function stop storage unit 19, all being interconnected as shown in FIG. 2. Herein, the signal processing unit 14 and the mode control unit 18 compose a central processing unit (CPU), and the ID code storage unit 15, the variable code storage unit 16, the function code storage unit 17 and the control function stop storage unit 19 compose a memory (such as an EEPROM).

In this case, the receiving unit 13 receives the transmitted signal detected by the receiving antenna 12, and reproduces a transmission code corresponding to the transmitted signal. The signal processing unit 14 then compares an ID code from the transmission code with an ID code stored in the ID code storage unit 15, and also compares a variable code (numerical code) from the transmission code with a variable code (numerical code) stored in the variable code storage unit 16, and when these codes match within a defined range, collates the function code in the transmission code with the function code stored in the function code storage unit 17, and supplies to a controlled unit (not shown) of the automobile a control signal corresponding to the function code. The mode control unit 18 is connected to the timer 20 and the ignition key 21 of the automobile, and as will be described in more detail below, when an input signal satisfies a predefined condition, sets an operation mode of the signal control unit 14 to any of a normal mode, an ID code write mode, and a control signal output stop mode. As described above, when the operation mode is set to the normal mode, the signal processing unit 14 generates a control signal corresponding to the function code and supplies it to the controlled unit (not shown) of the automobile. Conversely, the signal processing unit 14 writes the ID code in the transmission code into the ID code storage unit 15 when the operation mode is set to the ID code write mode. The control function stop storage unit 19 acts to hold an operation mode of the signal processing unit 14 to a control signal output stop mode which does not generate any control signal, when the function control stop code supplied from the mode control unit 18 is written.

In the keyless entry apparatus illustrated in FIG. 1 and FIG. 2, an operation is as follows when the operation mode of the signal processing unit 14 is set to the normal mode.

In the remote-con transmitter 1, when the transmitting switch 3 associated with a desired controlled unit of the automobile, for example a switch corresponding to a door lock, is operated by a user, switch information is supplied to the variable code conversion unit 6 and the function code conversion unit 7. The variable code conversion unit 6 outputs a numerical value (variable) code, which is different from a previously generated numerical value code, which corresponds to a updated counter value, and supplies the numerical value code to the transmitting code conversion unit 9. Moreover, an alteration of the numerical value corresponding to the update counter value in the variable code conversion unit 6 is preferably either an alternation in accordance with a defined numerical value formula or an alternation at random. The function code conversion unit 7 converts (the switch information) to a function code corresponding to a type of the switch information supplied thereto, for example, a code for executing to lock/unlock the door, and supplies to the transmitting code conversion unit 9. At this time, the ID code storage unit 8 also outputs a stored ID code intrinsic to this remote-con transmitter 1, and supplies the ID code to the transmitting code conversion unit 9. The transmitting code conversion unit 9 forms a transmission code which combines the ID code, the function code, the numerical value (variable) code supplied thereto, with the head code and the end code, and supplies the transmission code to the transmitting unit 10. The transmitting unit 10 converts the transmission code to a radio frequency (RF) signal, and transmits the transmission code as a transmission signal from the transmitting antenna 11.

The counter unit 4 reads out a previous count value stored in the count number storage unit 5 corresponding to the transmitting operation information supplied thereto, updates its count value by 1, and rewrites the count number storage unit 5 to a update count value.

In the receiver 2, when the transmission signal from the remote-con transmitter 1 is received at the receiving unit 13 through the receiving antenna 12, the receiving unit 13 amplifies and wave-shapes the transmission signal to reproduce the received transmission code, and supplies the received transmission code to the signal processing unit 14. The signal processing unit 14 compares the ID code in the received transmission code and the ID code stored in the ID code storage unit 15, and when they match, compares the numerical value (variable) code in the received transmission code with the numerical value (variable) code stored in the variable code storage unit 16. When the variable codes match within a defined range, the function code in the received transmission code is compared with the variety of function codes stored in the function code storage unit 17, and in a case that among the variety of function codes there is the one matched with the function code supplied with the received transmission code, the signal processing unit 14 generates a control signal for executing, for example, locking/unlocking of a door, and supplies this control signal to a door control unit (not shown). Thereby, a door of an automobile is controlled to unlock a key when it was locked, and to lock a key when it was unlocked. In addition, regardless of the operation mode, the signal processing unit 14 writes a variable code included in the transmission code into the variable code storage unit 16.

Further, in the signal processing unit 14, when comparing the ID code, the numerical value (variable) code, the function code, respectively, when it is not determined that any of these codes is in a range of a match or a rough match, the process is suspended.

Figure 3:
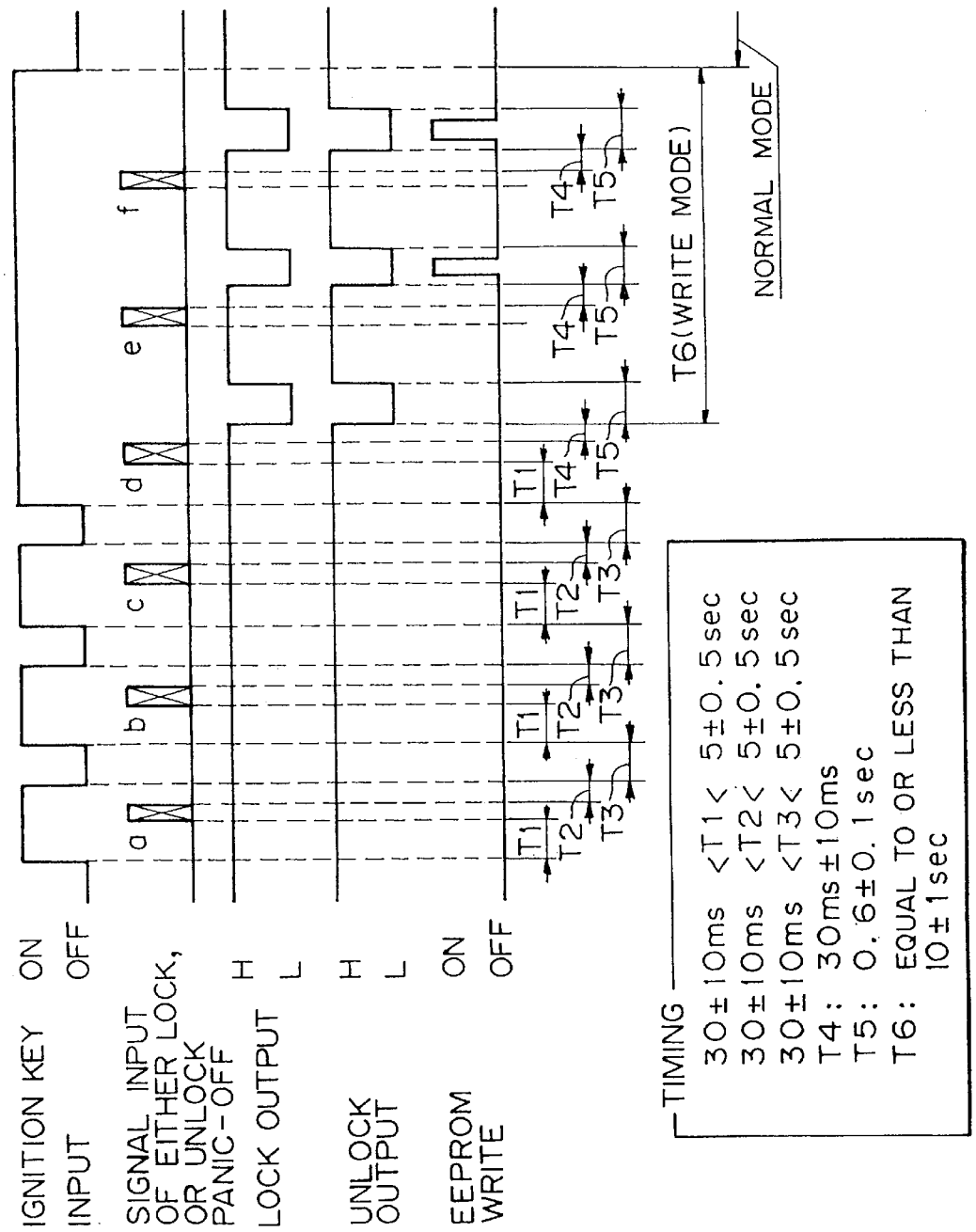
FIG. 3 is an operation illustration diagram showing one example of the operation procedures which sets the operation mode of the signal control unit to the ID code write mode, in the receiver illustrated in FIG. 2.

FIG. 3 is an operation illustration diagram showing one example of the operation procedures executed by the keyless entry apparatus when the operation mode of the signal processing unit 14 is set to the ID write mode, that is, when an ID code is written into (stored in) the ID code storage unit 15.

FIG. 3 shows the operation procedures for changing the keyless entry apparatus of this embodiment to the ID code write mode from the normal mode in response to a first predefined supply state of the transmission code and the externally applied information, and thereafter executing a writing of the ID code. Moreover, this operation is executed in a case of rewriting the ID code intrinsic to the remaining remote-con transmitters 1, other than the ID code intrinsic to that lost remote-con transmitter 1, into the ID code storage unit 15 on the receiver 2 side when one of a plurality of the remote-con transmitters 1 is lost, etc.

Initially, the operation mode of the signal processing unit 14 is changed to the ID write mode from the normal mode by the following procedures.

First, the ignition key 21 of the automobile is switched from the accessory (ACC) position (shown as OFF in FIG. 3) to the on (ON) position (shown ON in FIG. 3), thereby supplying the ON pulse to the mode control unit 18. During the period of time of this ON pulse, after a time T1 since a beginning of the ON pulse, if either of a lock (LOCK) switch, a unlock (UNLOCK) switch, or a panic-off (PANIC- OFF) switch from among the transmitting switches 3 in the remaining remote-con transmitter 1 is operated by the user, and a function code associated with such operation is transmitted with a transmission code from the remote-con transmitter 1. In the receiver 2, the function code in the received transmission code is supplied to the mode control unit 18. Then, within a time T2 since a supply of the function code has been stopped, switching the ignition key 21 from the ON position to the ACC position, then resetting to an initial state by stopping a supply of the ON pulse, and the first operation cycle is completed.

At the end of the first operation cycle, if the ignition key 24 is again switched from the ACC position to the ON position to supply the ON pulse to the mode control unit 18 within a time T3 since a supply of the ON pulse has been stopped, then a second operation cycle is started. During the second operation cycle, within a time T1 since a supply of the ON pulse has begun, the same switch operated during the first operation cycle is again operated by the user, thereby transmitting the same function code from the remote-con transmitter 1, and supplying the function code in the received transmission code to the mode control unit 18. Thereafter, within a time T2 after the function code has been received, the ignition key 21 is switched from the ON position to the ACC position, stopping a supply of the ON pulse and again resetting to the initial state, and the second operation cycle is completed.

At the end of the second operation cycle, if the ignition key 24 is again switched from the ACC position to the ON position to supply the ON pulse to the mode control unit 18 within a time T3 since a supply of the ON pulse has been stopped, then a third operation cycle is started. Since this third operation cycle is also exactly the same as the first and the second operation cycle, the operation details of the third operation cycle will be omitted. The ignition key 21 is then switched from the ON position to the ACC position to stop a supply of the ON pulse and again resetting to the initial state, thereby completing the third operation cycle.

After the third operation cycle, if the ignition key 24 is again switched from the ACC position to the ON position to supply the ON pulse to the mode control unit 18 within a time T3 since a supply of the ON pulse has been stopped, then a fourth operation cycle is started. During the fourth operation cycle, within a time T1 after a supply of the ON pulse has begun, up to a time at which the function code from the received transmission code is supplied to the mode control unit 18, the fourth operation cycle is the same as the first to the third operation cycles, but at a time when a time T4 has passed since a supply of the function code has stopped, an operation mode of the signal processing unit 14 is set to the ID code write mode. When set in the ID code write mode, the mode control unit 18 causes the signal processing unit 14 to output a control signal which locks a door as well as a control signal which unlocks a door within a time period of a time T5 one after another from the signal processing unit 14, thereby actuating the door lock to inform the user that the signal processing unit 14 has been set to the ID code write mode.

Next, the operation procedures for executing a writing of the ID code will be described.

After having been set to the ID code write mode, at a time of transmitting the transmission code including the ID code for writing in to the ID code storage unit 15 by an operation of the first remote-con transmitter 1, at a time when the transmission code is received at the receiver 2, then at a time when both the transmission code and the ON pulse from the ignition key 21 are simultaneously supplied to the mode control unit 18, and within the time T4 after a supply of the transmission code has been stopped, the mode control unit 18 causes the signal processing unit 14 to transmit the first ID code in the transmission code from the signal processing unit 14 into the ID code storage unit 15, and executes a writing of the first ID code into the ID code storage unit 15, and at the same time with this, causing a control signal for locking a door and a control signal for unlocking the door to be outputted from the signal processing unit 14 within a time period of T5 one after another, then actuating a lock key of the door accordingly, and thereby notifying the user that the ID code is written into the ID code storage unit 15.

Then, after having stopped the outputs of the control signal for locking the door and the control signal for unlocking the door from the signal processing unit 14, again, transmitting the transmission code including the second ID code for writing into the ID code storage unit 15 by an operation of the second remote-con transmitter 1, and at a time when the transmission code is received at the receiver 2, then at a time when both of this transmission code and the ON pulse from the ignition key 21 are simultaneously supplied to the mode control unit 18, and after having passed the time T4 since a supply of the ON pulse has been stopped, the mode control unit 18 forces the signal processing unit 14 and supplies the second ID code in the transmission code from the signal processing unit 14 into the ID code storage unit 15, and executes a writing of the second ID code into the ID code storage unit 15, and at the same time with this, causing a control signal for locking the door and a control signal for unlocking the door to be outputted from the signal processing unit 14 within a time period of T5 one after another, then actuating a lock key of the door accordingly, and thereby notifying the user that the second ID code is written into the ID code storage unit 15.

Next, in a case of executing a writing of a third ID code of a third remote-con transmitter 1 which is remained further, by executing the same operation procedures as two of the operation procedures mentioned previously, the third ID code is written into the ID code storage unit 15, and a completion of that writing could be seen by an operation of a lock key of the door.

Now, operation procedures for executing the ID code write such as described above has to be executed within a time period until lapsing the time T6 since the operation mode of the signal processing unit 14 has been set to the ID code write mode, or within a time period until a supply of the ON pulse would be stopped since the ignition key 21 has been switched from the ON to the ACC, and within these time periods, as illustrated in FIG. 3, with not limiting to execute writings of two ID codes, writings of three or more ID codes could be executed.

Then, after lapsing these time periods, the operation mode of the signal processing unit 14 is reset from the ID code write mode to the normal mode according to a control of the mode control unit 18.

In these series of operation procedures, each of the times T1, T2, and T3 is selected between 30+10 milliseconds and 5+0.5 seconds, and the time T4 is selected within 30+10 milliseconds, the time T5 is selected within 0.6+0.1 seconds, and the time T6 is selected within 10+1 seconds, respectively, and these times are properly modifiable. Further, all the measurements of these times T1 to T6 are executed by the timer 20.

Figure 4:
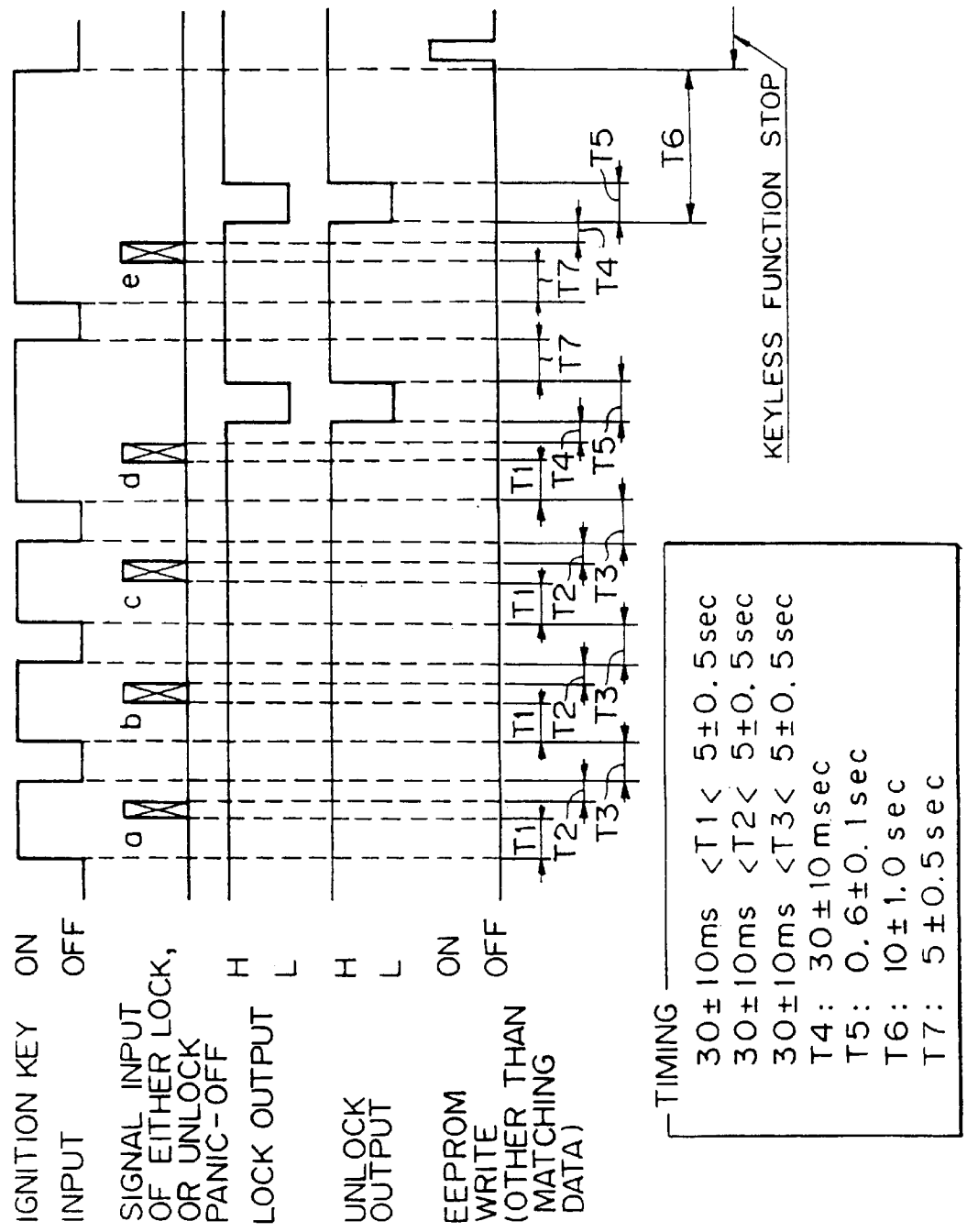
FIG. 4 is an operation illustration diagram showing one example of the operation procedures which sets the operation mode of the signal control unit to the control signal output stop mode, in the receiver illustrated in FIG. 2.

Further, FIG. 4 is an operation illustration diagram showing one example of operation procedures when setting the operation mode of the signal processing unit 14 to the control signal output stop mode, in response to a second predefined supply state of the transmission code and the externally supplied information received, in the keyless entry apparatus of this embodiment.

Here, with reference to FIG. 4, one example of the operation procedures when setting the keyless entry apparatus of this embodiment, from the normal mode to the control signal output stop mode will be described.

As shown in FIG. 4, this operation is executed in following to the operation until which the operation mode of the signal processing unit 14 is set from the normal mode to the ID code write mode. The operation mode of the signal processing unit 14 is set to the ID code write mode by sequentially passing the first operation cycle, the second operation cycle, the third operation cycle and the fourth operation cycle, which are described above.

In addition, the operation mode of the signal processing unit 14 is set to the ID write mode, and after having been outputted the control signal for locking the door and the control signal for unlocking the door from the signal processing unit 14 one after another within the time period T5, then the ignition key 21 is switched from the ON position to the ACC position, and stopping a supply of the ON pulse to the mode control unit 18, thereby completing the ID code write mode. Then, within the time T7 since having stopped a supply of the ON pulse, switching the ignition key 21 from the ACC position to the ON position again, and supplying the ON pulse to the mode control unit 18. In following, within the time T7 since having been started a supply of the ON pulse, operating a switch of either a lock, a unlock or a panic-off in the transmitting switch 3 of the remote-con transmitter 1 (the same switch as the one operated previously), transmitting a function code obtained in association with that operation from the remote-con transmitter 1, and supplying the function code received to the mode control unit 18. The mode control unit 18 forces the signal processing unit 14 after having passed the time T4 since having been completed a supply of the function code, and outputs the control signal for locking the door and the control signal for unlocking the door from the signal processing unit 14 one after another within the time T5, and by actuating the lock key of the door accordingly, thereby making it possible to see that a transfer to the control signal output stop mode is in progress. And, when lapsing the time T6 since immediately before outputting the control signal for locking the door and the control signal for unlocking the door from the signal processing unit 14, or when switching the ignition key 21 from the ON position to the ACC position within the time T6, and supplying the OFF pulse to the mode control unit 18, then the control function stop code is supplied from the mode control unit 18 to the control function stop storage unit 19, and with the control function stop storage unit 19 being to execute a writing of the control function stop code, the operation mode of the signal processing unit 14 is set to the control signal output stop mode.

In these series of operation procedures, each of the times T1, T2, and T3 is selected between 30+10 milliseconds and 5+0.5 seconds, and the time T4 is selected within 30+10 milliseconds, the time T5 is selected within 0.6+0.1 seconds, the time T6 is selected within 10+1 seconds, and the time T7 is selected within 5+0.5 seconds, respectively, but these times are properly modifiable.

Figure 5:
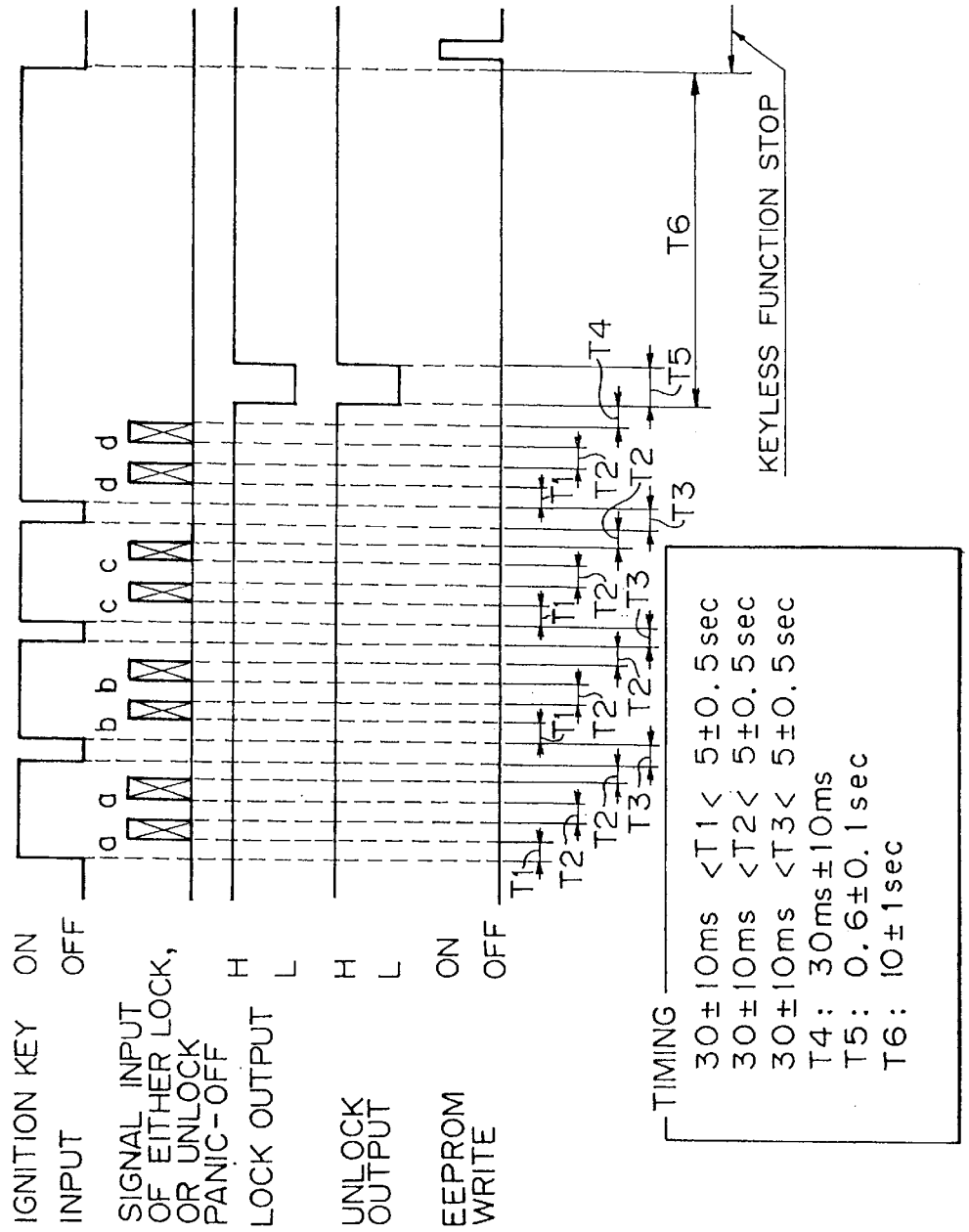
FIG. 5 is an operation illustration diagram showing other example of the operation procedures which sets the operation mode of the signal control unit to the control signal output stop mode, in the receiver illustrated in FIG. 2.
Figure 6:
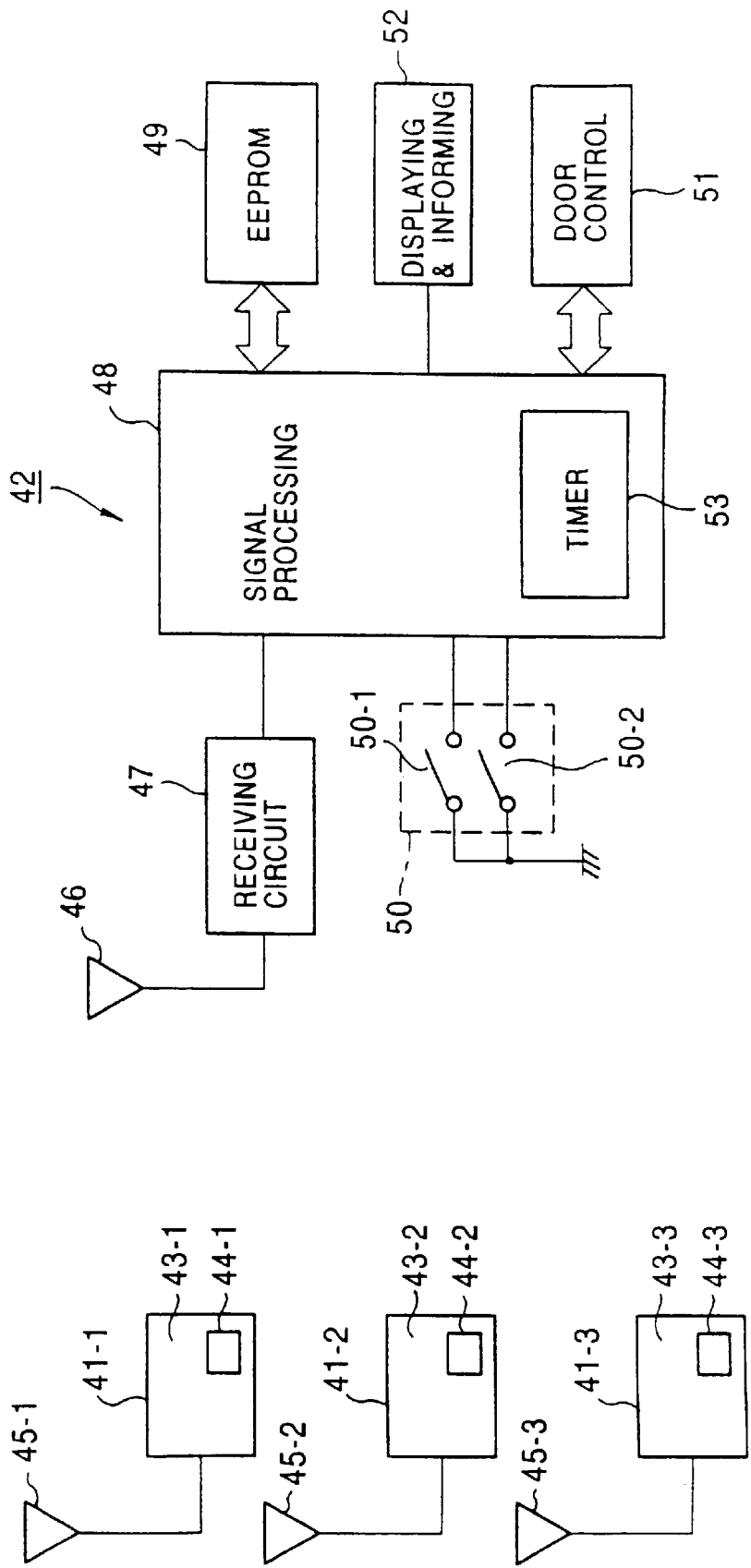
FIG. 6 is a schematic configuration diagram showing one example of a conventional keyless entry apparatus.

Further, FIG. 5 is an operation illustration diagram showing other example of operation procedures when setting the operation mode of the signal processing unit 14 to the control signal output stop mode, in the keyless entry apparatus of this embodiment.

Here, with reference to FIG. 5, other example of the operation procedures when setting the keyless entry apparatus of this embodiment, from the normal mode to the control signal output stop mode will be described.

This operation is such that in each of the first to the fourth operation cycles when setting the operation mode of the signal processing unit 14 having already been described, from the normal mode to the ID code write mode, during a time period in which the ON pulse is being supplied from the ignition key 21 to the mode control unit 18, operating twice a switch of either a lock, a unlock, or a panic-off in the transmitting switch 3 of the remote-con transmitter 1, then transmitting from the remote-con transmitter 1 two function codes obtained in association with those twice operations, and supplies the two function codes received to the mode control unit 18. In this case a timing for supplying the two function codes to the mode control unit 18 is such that a first function code is supplied within the time T1 since a supply of the ON pulse has been begun from the ignition key 21 to the mode control unit 18, and a second function code is supplied within the time T2 since the supply of the first function code has been stopped, and in the first to the third operation cycles, these operation cycles are completed when the OFF pulse was supplied from the ignition key 21 to the mode control unit 18 within the time T3 since the supply of the second function code has been stopped, and in the fourth operation cycle, that operation cycle is completed when lapsing the time T4 since the supply of the second function code has been stopped. Then, during a time period until lapsing the time T6 since the fourth operation cycle has been completed, the ON pulse is supplied continuously from the ignition key 21 to the mode control unit 18, and further, when no transmission code is transmitted from the remote-con transmitter 1, and also no transmission code is supplied to the mode control unit 18, if this time period was completed, or if the supply of the ON pulse from the ignition key 21 was stopped within this time period, then the control function stop code is supplied from the mode control unit 18 to the control function stop storage unit 19, and with the control function stop storage unit 19 being to execute a writing of the control function stop code, the operation mode of the signal processing unit 14 is set to the control signal output stop mode. Further, the mode control unit 18 forces the signal processing unit 14 at a point in time when the fourth operation cycle is completed, and outputs the control signal for locking the door and the control signal for unlocking the door one after another from the signal processing unit 14 within a time period of the time T5, actuating the lock key of the door accordingly, thereby it is arranged to notify that a preparation of setting the operation mode of the signal processing unit 14 to the control signal output stop mode was executed.

In these series of operation procedures, each of the times T1, T2, and T3 is selected between 30+10 milliseconds and 5+0.5 seconds, and the time T4 is selected within 30+10 milliseconds, the time T5 is selected within 0.6+0.1 seconds, the time T6 is selected within 10+1 seconds, respectively, but these times are properly modifiable.

Meanwhile, in this embodiment, even when the operation mode of the signal processing unit 14 was set to the control signal output stop mode, at each time when the transmission code is transmitted from the remote-con transmitter 1, the numerical value (variable) code in the transmission code is continued to be updated, even on the receiver 2 side, at each time when a receipt of the transmission code is executed, the numerical value (variable) code stored in the variable code storage unit 16 which is compared with the numerical value (variable) code in that transmission code is also updated. A reason for this is such that even in a case that the operation mode of the signal processing unit 14 is set to the control signal output stop mode, when there are a plurality of remote-con transmitters 1 besides the lost remote-con transmitter 1 and the carriers are differ for the transmitters, respectively, if the carrier of the remote-con transmitter 1, who does not know that the operation mode of the signal processing unit 14 is set to the control signal output stop mode, is continued to operate his/her own remote-con transmitter 1, the numerical value (variable) codes on that remote-con transmitter 1 are sequentially modified, but on the other hand, in a case that the operation mode of the signal processing unit 14 is set to the control signal output stop mode, if an update of the numerical value (variable) codes stored in the variable code storage unit 16 on the receiver 2 side was stopped, the differences between the numerical value (variable) codes on the remote-con transmitter 1 and these stored numerical value (variable) codes exceed a tolerance, and when resetting the operation mode of the signal processing unit 14 to the normal mode, the transmission code from that remote-con transmitter 1 could not be received.

Further, in this embodiment, when setting the operation mode of the signal processing unit 14 to the control signal output stop mode, in order to produce a third predefined supply state of the transmission code and the externally applied information and then to restore it, as one example, then by arranging that when setting to the control signal output stop mode by the operation procedures shown in FIG. 4, again, executing the operation procedures shown in FIG. 4, or when setting to the control signal output stop mode by the operation procedures shown in FIG. 5, again, executing the operation procedures shown in FIG. 5, the code for eliminating the control function stop code is supplied from the signal processing unit 14 to the control function stop storage unit 19, then the control function stop code written into the control function stop storage unit 19 is eliminated, thereby the operation mode of the signal processing unit 14 is reset from the control signal output stop mode to the normal mode. In this case, the third predefined supply state of the transmission code and the externally applied information is the same as the second predefined supply state of the transmission code and the externally applied information.

Besides this, when setting the operation mode of the signal processing unit 14 to the control signal output stop mode, in order to reset it to the normal mode, executing one or more of writing(s) of new ID code since the operation mode of the signal processing unit 14 has been set to the ID code write mode, thereafter, by completing of the ID code write mode, the code for eliminating the control function stop code is supplied from the signal processing unit 14 to the control function stop storage unit 19, and by eliminating of the control function stop code, and then resetting to the normal mode, are needed.

In this embodiment, at a time of an alternation of the operation mode of the signal processing unit 14, more concretely, in each of when setting from the normal mode to the ID code write mode, when setting from the normal mode to the control signal output stop mode, and when resetting from the control signal output stop mode to the normal mode, they are described with an example of passing the four times' same operation cycles consisting of the first to fourth operation cycles, but the number of repeats in the operation cycles in accordance with the present invention is not limited to four times, but it is preferably three times or five times.

Further, in this embodiment, at a time of an alternation of the operation mode of the signal processing unit 14, when using a combination of the ON pulse from the ignition key 21 and a switch information of either a lock, a unlock, or a panic-off from the remote-con transmitter 1 is described as an example, but the combination in accordance with the present invention is not limited to the above mentioned case, and it is preferably a combination of the ON pulse from the ignition key 21 and a switch information from a power window switch, or a repeatable supply in accordance with a predefined cycle of the ON pulse from the ignition key 21.

In this case, there is an advantage that at a time of combination with a switch information from the remote-con transmitter 1, only the authorized user of the remote-con transmitter 1, who is registered in the receiver 2, can set the operation mode of the signal processing unit 14 to the control signal output stop mode, but conversely, there is an advantage that at a time of non-combination with the switch information from the remote-con transmitter 1, when losing the remote-con transmitter 1, the operation mode of the signal processing unit 14 could be set to the control signal output stop mode without other remote-con transmitter 1.

Further, in this embodiment, when the communication apparatus is to be the keyless entry apparatus, is described as an example, but the communication apparatus in accordance with the present invention is not limited to the keyless entry apparatus, of course, it is preferable to other communication apparatus similar to the keyless entry apparatus.

In accordance with this embodiment, when one of the transmitters equal to or more than one has been lost, since it is possible to set an operation mode of the signal processing unit on the receiver 2 side from the normal mode to the control signal output stop mode, thereafter the lost transmitter is made impossible to use, thereby a unauthorized use of the lost transmitter can be prevented.

Further, in accordance with this embodiment, at a time when altering the operation mode of the signal processing unit 14, that is, in each of when setting from the normal mode to the ID code write mode, when setting from the normal mode to the control signal output stop mode, or when setting from the control signal output stop mode to the normal mode, since operation procedures for repeating the same operation cycles in several time are the main ones, and only slight operation procedures which have passed these operation procedures differ, so that the operation procedures are easy to remember when executing each setting at the user side.

Moreover, in accordance with this embodiment, when a previously lost transmitter was found, a reuse of this transmitter is made possible by simple operation procedures.

Other than these, in accordance with this embodiment, at a time of resetting the operation mode of the signal processing unit 14 from the control signal output stop mode to the normal mode, it is just needed to write a new ID code into the ID code storage unit 15, thereby a security of the communication apparatus itself could be improved.

What is claimed is:

1. A communication apparatus, comprising:

a transmitter for transmitting a transmission code including a first ID code and one of a plurality of function codes; and a receiver for receiving the transmission code, the receiver including:

a storage unit for storing a second ID code, a signal processing unit for comparing said received first ID code with said second ID code stored in said storage unit, and for generating a control signal to a controlled unit when the first ID code matches said second ID code, the control signal corresponding to said received function code; and a mode control unit for setting an operation mode of the signal processing unit from a normal mode, in which the signal processing unit transmits said control signal to said controlled unit, if the first ID code matches said second ID code, to one of (a) an ID code write mode in which said received first ID code is written into said storage unit in response to a first predefined supply state of an externally applied information and a received transmission code, (b) a control signal output stop mode in which an output of said control signal from said signal processing unit is stopped even if the first ID code matches said second ID code, in response to a second predefined supply state of an externally applied information and a received transmission code, and for resetting said operation mode of said signal processing unit from said control signal output stop mode to said normal mode when said operation mode of the signal processing unit is set in said control signal output stop mode, in response to a third predefined supply state of an externally applied information and a received transmission code.

2. A communication apparatus according to claim 1, wherein said operation mode of said signal processing unit is set to said control signal output stop mode, when said transmission code and externally applied information are supplied in said second predefined supply state, and when said operation mode of said signal processing unit is set from said normal mode to said ID code write mode, and then from said ID code write mode to said normal mode.

3. A communication apparatus according to claim 1, wherein a control function stop code is written into a control function stop storage unit when said operation mode of said signal processing unit is set to said control signal output stop mode, and said control function stop code written into said control function stop storage unit is eliminated when resetting from said control signal output stop mode to said normal mode.

4. A communication apparatus according to claim 2, wherein a control function stop code is written into a control function stop storage unit when said operation mode of said signal processing unit is set to said control signal output stop mode, and said control function stop code written into said control function stop storage unit is eliminated when resetting from said control signal output stop mode to said normal mode.

5. A communication apparatus according to claim 1, wherein said externally applied information is information obtained by an operation of an ignition key of an automobile.

6. A communication apparatus according to claim 2, wherein said externally applied information is information obtained by an operation of an ignition key of an automobile.

7. A communication apparatus according to claim 3, wherein said externally applied information is information obtained by an operation of an ignition key of an automobile.

8. A communication apparatus according to claim 1, wherein said transmitter sends a variable code as well as said ID code and function code, and said receiver evaluates whether said received variable code is proper or improper, and when said received variable code is proper, generates a control signal corresponding to the function code received with respect to said controlled unit from said signal processing unit.

9. A communication apparatus according to claim 2, wherein said transmitter sends a variable code as well as said ID code and function code, and said receiver evaluates whether said received variable code is proper or improper, and when said received variable code is proper, generates a control signal corresponding to the function code received with respect to said controlled unit from said signal processing unit.

10. A communication apparatus according to claim 3, wherein said transmitter sends a variable code as well as said ID code and function code, and said receiver evaluates whether said received variable code is proper or improper, and when said received variable code is proper, generates a control signal corresponding to the function code received with respect to said controlled unit from said signal processing unit.

11. A communication apparatus according to claim 5, wherein said transmitter sends a variable code as well as said ID code and function code, and said receiver evaluates whether said received variable code is proper or improper, and when said received variable code is proper, generates a control signal corresponding to the function code received with respect to said controlled unit from said signal processing unit.

12. The communication apparatus of claim 1, wherein the operation mode of the signal processing unit is set to the control signal output stop mode and a variable code in the transmission code is continually updated.

13. The communication apparatus of claim 12, wherein a second variable code stored in a variable code storage unit is continually updated.

* * * * *